Patented July 27, 1937

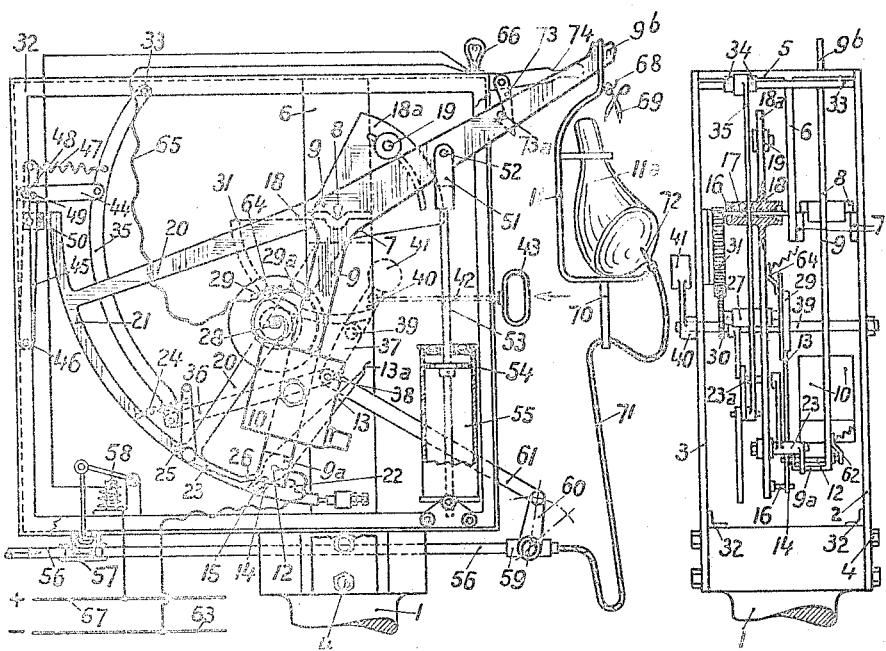

2,088,257

UNITED STATES PATENT OFFICE 2,088,257

DEVICE FOR PICKLING MEAT WITH THE AID OF PICKLING BRINE TO BE INTRODUCED INTO THE LATTER

Georg Beisser, deceased, late of Hamburg-Rahlstedt, Germany, by Charlotte Beisser, administratrix, Hamburg-Rahlstedt, Germany Application July 27, 1933, Serial No. 682,524
In Switzerland June 19, 1933

37 Claims. (Cl. 99—256)

The process of pickling meat with the aid of pickling brine to be introduced into the latter presents certain difficulties, because the weight of the pickling brine to be introduced must be a certain percentage of the weight of the meat to be pickled, while the picklers employed to carry out this work are uneducated employees who cannot be expected to calculate without making mistakes such percentages by weight and to measure the weights of brine to be introduced, the time commercially allowable for such calculations being short. Errors in the calculations and in the measurements of the weights of brine to be introduced produce however extremely disadvantageous results, because meat which has not been sufficiently pickled is liable to deteriorate or to become putrefied, whereas a piece of meat which has been pickled too much becomes unpalatable. Consequently the problem to be solved by the present invention is the provision of a device by means of which an amount of brine is automatically introduced into the piece of meat, the weight of which brine is the correct percentage of the weight of the piece of meat, without any calculations or adjustments whatever having to be performed by the employees attending to the device. The problem in question is solved according to the invention by means of a regulating device by means of which the brine introduced into the piece of meat is automatically so measured off that before the introduction of the brine, its weight is a certain known percentage of the weight of the piece of treated meat, which percentage is such as to guarantee the preservation of the meat. Such a device may be in the arrangement of a shutting-off device in the brine conduit, by means of which the introduction of brine is automatically interrupted as soon as the weight of brine introduced is that percentage of the weight of the treated piece of meat before the introduction of the brine which guarantees the keeping of the meat.

Now the pieces of meat to be treated possess the peculiarity that during their preparation the capillaries and finer branches of the vascular system, which according to a process, which has already been proposed, may serve for the introduction of the brine, have been partially cut off, so that even during the introduction of the brine a certain portion of the same escapes through the openings produced. Consequently the weight of brine finally introduced would not be that percentage of the weight of the piece of meat which is requisite for preserving the meat.

Therefore in a further development of the invention the proposed device is characterized by arrangement for the automatic, and if desired, the repeated, opening of the brine supply conduit as soon as the weight of the brine already introduced into the piece of meat diminishes and for the permanent automatic closure of the brine supply conduit as soon as the weight of brine introduced remains constant at the determined percentage of the weight of the piece of meat.

Now such devices may be constructed in the most various ways. One constructional form of such a device is illustrated by way of example in the accompanying drawing in which:—

Fig. 1 is in part an elevation of the device after the removal of the side walls and in part a partial longitudinal section through the brine supply conduit and the air-cataract, and Fig. 2 a rear elevation of the device.

The device consists of a standard 1 to which the perpendicular supporting bars 2 and 3 are secured by means of bolts 4. The two bars are connected together by means of a cross-piece 5 to which the tongue 6 is connected. The bar 2 and the tongue 6 carry seatings 7 on which with the aid of knife-edges 8 a two-armed lever 9 revolubly rests. On the one end 9a of this lever 9 there is arranged an adjustable counterweight 10 and on the other end 9b a device 11 for holding the piece of meat. The end 9a of the lever is twice bent over at right angles in order to be able to hold the spindle 12 with which a contact finger 13 is fixedly connected. In the forked end 14 of the contact finger 13 there engages the bolt or pin 15. The pin 15 is carried by the arc-shaped part 21 of a two-armed lever 18, which by means of a ball bearing is arranged readily revoluble about the axle 17, which is fixedly mounted between the bar 3 and the tongue 6. At 18a the one arm of the lever 18 is formed in the shape of a sector; the sector carries at 19 a counterweight which is adjustable in the direction of rotation. The part of the two-armed lever 18 opposite the sector 18a is formed as an arc-shaped member 21 which is connected by means of arms 20 with the sector-shaped part 18a of the two-armed lever 18. The arc-shaped member 21 carries a step 22 which rests against the end 9a of the lever 9. Further, there is mounted on the arc-shaped member 21 a two-armed revoluble detent-lever 23, which is drawn by means of the spring 24 against the stop-pin 25 which is likewise arranged on the arc-shaped member 21. The end 26 of the detent-lever 23 thus rests against that edge of the end 9a of the arm of the lever 9, which is at the opposite side of the arm to that pressed against the stop 22. The lever 18 is in this manner coupled with the end 9a of the lever 9. At 27 the lower arm of the lever 18 forms a nave for holding the shaft 28, with which on the one side of the arm 20 a contact-disc 29 is fixedly connected while a toothed wheel 30 is carried on said shaft at the other side of the arm. The toothed wheel 30 engages with an arc-shaped toothed rack 31 which is fixedly arranged on the bar 3. Between the frame-like bars 32, to which the walls requisite for covering the device are fastened, there is moreover held a spindle 33 on which a single-armed lever 35 is loosely revolubly mounted at one end between the adjustable rings 34. On the other end of the lever 35 there is likewise loosely revolubly mounted the link 36 which is revolubly connected with a lever 37 by means of a pin 38. The lever 37 is fixedly connected with a shaft 39; said shaft 39 is revolubly supported on the bars 2 and 3 through holes in which it passes. With the shaft 39 there is also fixedly connected a lever 40 with a weight 41. To the lever 40 there is pivoted a rod 42 provided at its end with a handle 43. With the lever 35 there also engages a rod 44, which is connected with the lever 45 which is mounted on the shaft 46. A spring 47 continually draws the lever 45 towards the single-armed lever 35. The rod 44 possesses a slot 48 in which the pin 49 which is fixed on the lever 45 slidingly engages. The rod 44 consequently merely serves to limit the distance between the lever 45 and 35 in opposition to the action of the spring 47. On the lever 45 there is moreover arranged a rubber buffer 50, which during movements of the lever 45 in the direction of the hands of a clock rests against the arc-shaped member 21 of the lever 18. On the two-armed lever 9 there is arranged at 52 the fork 51 of a piston-rod 53. The piston 54 carried by the piston-rod 53 moves with a certain predetermined play in the cylinder 55, which is arranged revolubly relatively to the frame 32. The arrangement 51—55 consequently serves as an air-cataract in order to damp the oscillatory movements of the two-armed lever 9. In the conduit 56, which serves to supply brine in the direction of the arrow there is arranged a valve 57, the closure member of the valve being subjected to the action of the electro-magnet 58. The fluid pressure in the conduit 56 is sufficient for keeping the valve open against the force of gravity of the valve disk, valve rod and armature of the electromagnet. At the other end of the brine conduit a cock 59 is provided which is connected by means of the lever 60, connecting rod 61 and pin 38 with the lever 37. Against the spindle 12 on the lever 9a, which is fixedly connected with the contact finger 13, there continually rests a contact-spring 62, which is connected with the negative lead 63 of the electric circuit. Another contact spring 64 rests continually against the disc 29. The carrying disc 29 carries at its side at which the contact finger 13 is situated a curved contact piece 29a the edge of which is in the shape of an Archimedean spiral, on which edge the contact spring 64 permanently slides. The sliding contact 64 is connected by way of the lead 65 with a control lamp 66. The terminal of the control lamp 66 is connected to the winding of the electro-magnet 58 and by way of the latter to the positive lead 67 of the electric circuit. Finally there is arranged on the holding device 11 a hook 68 for holding a squeezing tool 69 for squeezing comparatively large open vessels. Moreover the device 11 has a suspension device 70 for holding the movable brine conduit 71. The movable brine conduit 71 ends in a nozzle 72 which is introduced into the vascular systems, preferably into the artery of the piece of meat 11a to be treated. The retaining hook 73 engages with a pin 73a on the two-armed lever 9 in order to hold the latter firmly in the initial position, release being effected by means of the handle 74.

The mode of operation of the above described device is as follows. It will be assumed that as a piece of meat a ham is to be pickled. In the case of arterial pickling the nozzle 72 is introduced into the artery and in the case of pickling by injection a nozzle in the form of a hollow needle is inserted in a piece of muscle on the ham 11a. Hereupon by actuating the handle 74 the hook 73 is released so that the lever arm 9b sinks and the lever arm 9a rises in opposition to the weight 10 until a condition of equilibrium is brought about.

The rapid attainment of this condition of equilibrium is favoured by the action of the air-cataract 51—55. The two-armed lever 18 participates in the movements of the lever 9 because it is connected by means of the stops 22 and 26 with the lever 9. During this motion the toothed wheel 30 rolls on the toothed segment 31, so that the disc 29 rotates with the contact piece which is fixed to it. After the condition of equilibrium has been attained the handle 43 is shifted in the direction of the arrow. By means of this movement the shaft 39 is turned so that the lever 37 which is fixedly connected with it moves the draw-rod 36 in the opposite direction to that in which the handle 43 is moved. The result is that the lever 35 performs a rotary movement about the point 33 in the opposite direction to the hands of a clock. On account of the action of the spring 47 the buffer 50 on the lever 45 rests against the arc-shaped member 21 of the lever 18 in order to hold the latter. The slot 48 however renders possible a further rotary movement of the lever 35 in the opposite direction to the hands of a clock so that the lever 35 strikes against the pin 23a of the double-armed lever 23, whereby the lever-arm 26 moves out of reach of the lever-arm 9a. Through the turning of the shaft 39 by means of the handle 43, that is, through the turning of the lever 37, which is rigidly connected with said shaft, the cock 59 of the brine supply conduit is simultaneously opened by means of the members 61, 60. The brine, which is under pressure, consequently from this instant onwards passes by way of the nozzle 72 into the piece of meat to be pickled. If it be found that the brine escapes to a considerable extent, through the comparatively large vessels which have been cut, said vessels are closed by squeezing them with the squeezing tool 69. In order that hereby no variation may occur in the condition of equilibrium of the weighing balance-system 9a, 9b these tools are from the start suspended from the hook 68 of the device 11. On account of the introduction of the brine the piece of meat becomes heavier, so that the lever arm 9b sinks and the lever arm 9a rises. This motion upwards is now no longer transmitted to the lever system 18 because by the movement of the stop 26 out of the reach of the lever arm 9a, the two systems are uncoupled from one another. The lever system 18 however retains the position which has been taken up on the placing of the piece of meat in the device 11, because the rubber buffer 50 rests against the arc-shaped member 21 under the influence of the spring 47 and prevents the same, and consequently the lever system 18, from moving automatically. On account of the motion of the lever arm 9a relatively to the arc-shaped member 21, which is thus produced, there takes place a turning of the contact finger 13 or of its contact-spring 13a about the spindle 12 in a direction towards the contact 29a of the disc 29. At the instant at which the contact spring 13a touches the contact 29a the circuit is closed so that the electro-magnet 58 is excited and the armature is attracted and consequently the valve 57 is closed; the supply of brine is consequently shut off. At the same time the control lamp 66 lights up. Now, for example on account of the separation of the piece of meat from the skin, there have been opened a comparatively large number of fine capillaries and of comparatively small vessels through which there occurs a loss of brine in comparatively small quantities. The closure of these numerous openings by squeezing them is impossible. On the other hand these capillaries and smaller vessels become closed after they have let through a certain quantity of brine, this taking place automatically by plugs formed of blood which was still in these fine vessels. On account of the escape of brine the lever arm 9b rises, while lever arm 9a sinks. Consequently the contact spring 13a of the contact finger 13 is released from the contact 29a, so that the current is interrupted and the electromagnet is de-energized. The valve 57 consequently opens again automatically and brine is again supplied. When, after one or more repetitions of this procedure, the indication is given by the permanent illumination of the control lamp 68 that the piece of meat 11a is saturated with the correct predetermined weight of brine, the supply nozzle 72 is taken away and the ham removed. At the same time the handle 43 is moved in the opposite direction to that indicated by the arrow, so that the lever 18 is free to move through the buffer 50 being released from the arc-shaped member 21. Under the influence of the spring 24 the lever arm 26 returns back into the position for coupling up the lever arm 9a. By means of the movement of the handle 43 the brine supply at 59 is at the same time shut off, while the valve 57 on account of the release of the contact-spring 13a from the contact 29a is opened again. The lever-system 9a, 9b has returned into its initial position in which it is locked with the lever-system 18 and is held in this position by inserting the detent-hook 73 by means of the handle 74.

The contact 29a, of the disc 29 is shaped in the form of an Archimedean spiral because in the case of rotary movements of an Archimedean spiral the difference of the radii is proportional to the lengths of the arcs up to these radii, calculated from a common origin. Consequently in each position of the contact 29a a weight of brine is introduced which is a quite definite percentage of the weight of the piece of meat, which percentage is invariable and independent of the weight of the piece of meat. In order to be able to pickle with one of the same devices pieces of meat to suit various tastes, for example to be able to produce a sharp, moderately sharp or a mild effect, the contact 29a can be exchanged. Likewise several contacts 29a may be arranged side by side about a common axis and co-operate with a displaceable contact-finger 13 or with a series of contact-fingers, those pointers which do not come into consideration being excluded from the influence of the electric circuit.

The nozzle 72 contains a valve which opens automatically when the brine supply conduit is opened and which closes automatically when the supply of brine is shut off. In this manner a loss of brine is avoided and moreover the condition of the weight of the conduit 71 is prevented from varying.

It is claimed:—

1. Apparatus for introducing brine into pieces of meat of different weights for the purpose of pickling the same comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, means operated by the weight of the meat for separating said contacts by a distance proportional to the weight of the meat and means operated by the weight of the brine introduced for moving said contacts into contact with one another as soon as the weight of the brine introduced amounts to said percentage.

2. Apparatus for introducing brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, counter-weighted lever mechanism operated by the weight of the meat for separating said contacts by a distance proportional to the weight of the meat and counterweighted lever mechanism operated by the weight of the brine introduced for moving said contacts into contact with one another as soon as the weight of the brine introduced amounts to said percentage.

3. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counterweighted lever arranged on said frame and supporting the piece of meat on one arm and carrying one of said contacts, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

4. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever, means interconnecting the latter hand-operated means with said hand-operated uncoupling means and with the hand-operated means for opening the conduit and means under the influence of the weight of the brine introduced, for moving the first contact towards the second.

5. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and arranged co-axially with the first lever and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat, while coupled to the first lever and means, under the influence of the weight of the brine introduced, for moving the first contact towards the second.

6. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and arranged co-axially with the first lever and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever, means for interconnecting the latter hand-operated means with said hand-operated uncoupling means and with the hand-operated means for opening the conduit and means under the influence of the weight of the brine introduced, for moving the first contact towards the second.

7. Apparatus for introducing pickling brine into pieces of meat of different weights for the purpose of pickling the same comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a hand-operated detent for holding said lever in its initial position of rest, a second revoluble two-armed counter-weighted lever mounted on said frame carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means under the influence of the weight of the brine introduced, for moving the first contact towards the second.

8. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, damping means connected with said lever, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

9. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, an air-cataract connected with said lever, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

10. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a meat holder revolubly supported on said lever, a second revoluble two-armed counter-weighted lever mounted on said frame and carrying the second of said contacts, means for coupling said counter-weighted levers together before brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

11. Apparatus for introducing pickling brine into pieces of meat of different weights for the purpose of pickling the same, comprising a brine supply conduit for connection to a piece of meat, a nozzle, provided with a low pressure valve, at the end of said conduit, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever, mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means under the influence of the weight of the brine introduced, for moving the first contact toward the second.

12. Apparatus for introducing pickling brine into pieces of meat of different weights for the purpose of pickling the same comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a signalling device in said circuit, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

13. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble contact lever revolubly mounted on said lever and carrying one of said contacts, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

14. Apparatus for introducing pickling brine into pieces of meat of different weights for the purpose of pickling the same comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble two-armed contact-lever revolubly mounted on said lever, and having one arm provided with a forked end, and carrying one of said contacts, a second revoluble two-armed counter-weighted lever mounted on said frame and carrying the second of said contacts, a pin on said lever engaging in the forked end of the arm of the contact lever on the first counter-weighted lever, means for coupling said counter-weighted levers together before the brine is introduced, means for separating said second contact from the first contact by a distance proportional to the weight of the meat, hand-operated means for uncoupling said levers and hand-operated means for retaining the second lever in the position taken up under the influence of the weight of the meat while coupled to the first lever.

15. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and lever mechanism under the influence of the weight of the brine introduced, for moving the first contact towards the second.

16. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and lever mechanism mounted on said counter-weighted levers under the influence of the weight of the brine introduced, for moving the first contact towards the second.

17. Apparatus for introducing pickling brine into pieces of meat of different weights for the purpose of pickling the same comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, said counter-weighted levers abutting against one another before the brine is introduced, a spring-influenced detent on one of said levers and engaging with the other for normally maintaining said abutting condition and coupling the levers together before the brine is introduced, means for separating said second contact from the first contact by a distance proportional to the weight of the meat, hand-operated means for disengaging said spring-influenced detent and uncoupling said levers, hand-operated means for retaining the second lever in the position taken up under the influence of the weight of the meat while coupled to the first lever and means, under the influence of the weight of the brine introduced, for moving the first contact towards the second.

18. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts and having one arm in the form of a sector, means for coupling said counter-weighted levers together before the brine is introduced, means for separating said second contact from the first contact by a distance proportional to the weight of the meat, hand-operated means for uncoupling said levers, a buffer, displaceable by hand, for bearing against the sector-shaped arm of the second lever in the position taken up under the influence of the weight of the meat while coupled to the first lever and means, under the influence of the weight of the brine introduced, for moving the first contact towards the second.

19. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts and having one arm in the form of a sector, means for coupling said counter-weighted levers together before the brine is introduced, means for separating said second contact from the first contact by a distance proportional to the weight of the meat, hand-operated means for uncoupling said levers, a spring-influenced buffer, displaceable by hand, for bearing against the sector-shaped arm of the second lever in the position taken up under the influence of the weight of the meat while coupled to the first lever and means, under the influence of the weight of the brine introduced, for moving the first contact towards the second.

20. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, said second contact being revoluble on said lever, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

21. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, said second contact being revoluble on said lever and having parts at different distances from its axis of revolution, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

22. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and carrying the second of said contacts, said second contact being in the form of a revoluble Archimedean spiral, means for coupling said counter-weighted levers together before the brine is introduced, means for rotating said second contact through an angle proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

23. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble, two-armed counter-weighted lever arranged on said frame and supporting the piece of meat on one arm and carrying one of said contacts, a second revoluble two-armed counter-weighted lever mounted on said frame and carrying the second of said contacts, said second contact being detachable and readily interchangeable, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

24. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a second revoluble two-armed counter-weighted lever mounted on said frame and a toothed wheel revolubly mounted on said lever, means connecting the second of said contacts with said wheel, a toothed sector fixed on the frame and engaging with said wheel, means for coupling said counter-weighted levers together before the brine is introduced, means for separating said second contact from the first contact by a distance proportional to the weights of the meat, hand-operated means for uncoupling said levers, hand-operated means for retaining the second lever in the position taken up under the influence of the weight of the meat while coupled to the first lever and means under the influence of the weight of the brine introduced, for moving the first contact towards the second.

25. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble contact lever revolubly mounted on said lever and carrying one of said contacts, a second revoluble two-armed counter-weighted lever mounted on said frame and carrying the second of said contacts, said second contact being revoluble on said lever, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

26. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble contact lever revolubly mounted on said lever and carrying one of said contacts, a second revoluble two-armed counter-weighted lever mounted on said frame and carrying the second of said contacts, said second contact being in the form of a revoluble Archimedean spiral, means for coupling said counter-weighted levers together before the brine is introduced, means for rotating said second contact through an angle proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

27. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble contact lever revolubly mounted on said lever and carrying one of said contacts, a second revoluble two-armed counter-weighted lever mounted on said frame and a toothed wheel revolubly mounted on said lever, means connecting the second of said contacts with said wheel, a toothed sector fixed on the frame and engaging with said wheel, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

28. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble two-armed contact lever revolubly mounted on said lever, and having one arm provided with a forked end, and carrying one of said contacts, a second revoluble two-armed counter-weighted lever mounted on said frame and carrying the second of said contacts, said second contact being revoluble on said lever, a pin on said lever engaging in the forked end of the arm of the contact lever on the first counter-weighted lever, means for coupling said counter-weighted levers together before the brine is introduced, means for separating said second contact from the first contact by a distance proportional to the weight of the meat, hand-operated means for uncoupling said levers, and hand-operated means for retaining the second lever in the position taken up under the influence of the weight of the meat while coupled to the first lever.

29. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble two-armed contact lever revolubly mounted on said lever, and having one arm provided with a forked end, and carrying one of said contacts, a second revoluble two-armed counter-weighted lever mounted on said frame and carrying the second of said contacts, said second contact being in the form of a revoluble Archimedean spiral, a pin on said lever engaging in the forked end of the arm of the contact lever on the first counter-weighted lever, means for coupling said counter-weighted levers together before the brine is introduced, means for rotating said second contact through an angle proportional to the weight of the meat, hand-operated means for uncoupling said levers and hand-operated means for retaining the second lever in the position taken up under the influence of the weight of the meat while coupled to the first lever.

30. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm, a revoluble two-armed contact-lever revolubly mounted on said lever, and having one arm provided with a forked end, and carrying one of said contacts, a second revoluble two-armed counter-weighted lever mounted on said frame and a toothed wheel revolubly mounted on said lever, means connecting the second of said contacts with said wheel, a toothed sector fixed on the frame and engaging with said wheel, said second contact being in the form of a revoluble Archimedean spiral, a pin on said lever engaging in the forked end of the arm of the contact lever on the first counter-weighted lever, means for coupling said counter-weighted levers together before the brine is introduced, means for separating said second contact from the first contact by a distance proportional to the weight of the meat, hand-operated means for uncoupling said levers, and hand-operated means for retaining the second lever in the position taken up under the influence of the weight of the meat while coupled to the first lever.

31. Apparatus for introducing pickling brine into pieces of meat of different weights for the purpose of pickling the same comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a predetermined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a hand-operated detent for holding said lever in its initial position of rest, an air-cataract connected with said lever, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

32. Apparatus for introducing pickling brine into pieces of meat of different weights for the purpose of pickling the same, comprising a brine supply conduit for connection to a piece of meat, hand-operated means for opening and closing said conduit, separate automatic means for closing and opening said conduit, and electric means for operating said automatic means to shut off the supply as soon as the weight of brine introduced is a pre-determined percentage of the weight of the piece of meat before the introduction of the brine, said electric means comprising an electric circuit having two contacts in contact with one another when the circuit is closed, a frame, a revoluble two-armed counter-weighted lever arranged on said frame and supporting the piece of meat on one arm and carrying one of said contacts, a hand-operated detent for holding said lever in its initial position of rest, an air-cataract connected with said lever, a meat holder revolubly supported on said lever, a second revoluble two-armed counter-weighted lever mounted on said frame and carrying the second of said contacts, means for coupling said counter-weighted levers together before the brine is introduced, means for separating said second contact from the first contact by a distance proportional to the weight of the meat, hand-operated means for uncoupling said levers, hand-operated means for retaining the second lever in the position taken up under the influence of the weight of the meat while coupled to the first lever and means, under the influence of the weight of the brine introduced, for moving the first contact towards the second.

33. Apparatus for introducing pickling brine into pieces of meat of different weights for the purpose of pickling the same, comprising in combination a brine supply conduit for connection to a piece of meat, opening and closing members in said conduit for controlling the supply of pickling brine to the piece of meat, the opening member being hand-controlled and the closing member automatically controlled, means for automatically operating said closing member as soon as the relative ratio between the weight of fresh meat and the received weight of brine is attained for ensuring the preservation of the piece of meat, said means comprising a first device moving under the influence of the piece of meat and occupying a certain position for a certain weight of fresh meat, said means also comprising a second device moving under the influence of the received weight of brine, said means also comprising releasing means for the closing member dependent on the distance between the first device and the second device which varies with variable brine contents of the piece of meat, the releasing means automatically responding to a distance predetermined for each weight of fresh meat.

34. Apparatus according to claim 33, members arranged on the first device and the second device, said members being formed as parts of the releasing means of the closing member, the member influenced by the first device being variable in its position by the weight of the original meat, the member influenced by the second device being variable in its position by the weight of the original meat and the brine supplied thereto, said members being so designed that they are in contact in those positions of the first device and the second device which these devices occupy as soon as the weight of the brine supplied to the piece of meat effects the preservation of the piece of meat, said members being formed as contact pieces of a circuit, said circuit containing the current source and an electromagnetically controlled member adapted to control the means for effecting the locking position of the closing member.

35. Apparatus according to claim 33, members arranged on the first device and the second device, said members being formed as parts of the releasing means of the closing member, the member influenced by the first device being variable in its position by the weight of the original meat, the member influenced by the second device being variable in its position by the weight of the original meat and the brine supplied thereto, said members being so designed that they are in contact in those positions of the first device and the second device which these devices occupy as soon as the weight of the brine supplied to the piece of meat effects the preservation of the piece of meat, said members being formed as contact pieces of a circuit, said circuit containing the current source and an electromagnetically controlled member adapted to control the means for effecting the locking position of the closing member, the contact of the first device being in the form of a spiral and the contact of the second device being in the form of a contact finger moving toward and away from the contact spiral.

36. Apparatus according to claim 33, members arranged on the first device and the second device, said members being formed as parts of the releasing means of the closing member, the member influenced by the first device being variable in its position by the weight of the original meat, the member influenced by the second device being variable in its position by the weight of the original meat and the brine supplied thereto, said members being so designed that they are in contact in those positions of the first device and the second device which these devices occupy as soon as the weight of the brine supplied to the piece of meat effects the preservation of the piece of meat, said members being formed as contact pieces of a circuit, said circuit containing the current source and an electromagnetically controlled member adapted to control the means for effecting the locking position of the closing member, the contact of the first device being in the form of a spiral and the contact of the second device being in the form of a contact finger moving toward and away from the contact spiral, said contact spiral being rotatably mounted and the angular positions of said contact spiral being variable in dependence on the positions of the first device.

37. Apparatus according to claim 33, members arranged on the first device and the second device, said members being formed as parts of the releasing means of the closing member, the member influenced by the first device being variable in its position by the weight of the original meat, the member influenced by the second device being variable in its position by the weight of the original meat and the brine supplied thereto, said members being so designed that they are in contact in those positions of the first device and the second device which these devices occupy as soon as the weight of the brine supplied to the piece of meat effects the preservation of the piece of meat, said members being formed as contact pieces of a circuit, said circuit containing the current source and an electromagnetically controlled member adapted to control the means for effecting the locking position of the closing member, the contact of the first device being in the form of a spiral and the contact of the second device being in the form of a contact finger moving toward and away from the contact spiral which is interchangeable.

CHARLOTTE BEISSER,
*Administratrix of Georg Beisser, Deceased.*